G. BYRNS AND H. SANCHE.
SAW SET.
APPLICATION FILED MAR. 31, 1920.

1,374,279.

Patented Apr. 12, 1921.

INVENTORS
GARRETT BYRNS & HENRI SANCHE,
BY ATTORNEY

UNITED STATES PATENT OFFICE.

GARRETT BYRNS AND HENRI SANCHE, OF RAINY RIVER, ONTARIO, CANADA.

SAW-SET.

1,374,279.   Specification of Letters Patent.   Patented Apr. 12, 1921.

Application filed March 31, 1920. Serial No. 370,218.

*To all whom it may concern:*

Be it known that we, GARRETT BYRNS and HENRI SANCHE, citizens of the Dominion of Canada, residing at Rainy River, in the district of Rainy River and Province of Ontario, Canada, have invented certain new and useful Improvements in Saw-Sets, of which the following is a specification.

This invention relates to saw sets, and its object is to provide a novel construction whereby the teeth of a saw can be set to any desired angle.

With this and other objects in view, the invention consists in the construction, combination and arrangement of parts as will be hereinafter fully described, illustrated in the accompanying drawings, and pointed out in the claim hereunto appended.

Figure 1 is a perspective view of our invention,

Fig. 2 is a sectional view with the operative member pressed downwardly,

Fig. 3 is a sectional view with the operative member in open position before pressing down on the teeth of the saw, and Fig. 4 is an enlarged view of the setting block.

Referring to the drawings like numerals designate like parts in the various drawings.

The numeral 5 designates the base board of a saw set which is provided at its front edge with an upright member 4. The base member is provided with a longitudinal slot 6 in which is positioned an L-shaped adjustable member 7 which is provided with a tightener nut 8 so that this adjustable member 7 can be fitted against the back of a saw to hold the front edge against the upright portion 6 while sharpening the saw. Opposite the longitudinal slot 6 is a slot 9 in the upright 4 over which a rod 10 is positioned and held. On this rod a head 11 is hingedly mounted, which head is provided with a handle 12 which may be bent in any suitable position for operating purposes. The head 11 is provided with one side flanged outwardly as at 14 and its front side 15 rounded eccentrically.

16 is a base on which the setting block 17 is rigidly positioned. This base is provided with annular openings 18 through which suitable bolts 19 pass and connect the base 16 to the under side of the base 5. The base 5 is provided with a suitable opening 20 for the reception of the setting block 17. 22 are tighteners threadedly engaged near the four corners of the base 16 and are adapted to tighten against the under side of the base 5 so as to hold the base in tightened position to the distance that the bolts 19 will allow the base 16 to be in relation to the base 5.

The setting block 17 is preferably rectangular in shape but has one corner as at 24 cut off at an angle, which corner is positioned opposite the rounded face 15 of the head 14 so that when the saw 25 is placed in position on the base 5 the tooth of the saw will go under the head 14. On pressing the handle 12 downwardly the head 14 will press on the tooth of the saw so as to set it in the desired position. If it is desired to have a wide setting the thumb nuts on the bolts 19 are turned downwardly so as to allow the block to drop farther and the head 14 will be allowed to turn farther before pressing the tooth against the side 14. Vice-versa if desirous of a narrow setting, the block 17 is raised so that the tooth of the saw is not bent out as far as in the other case.

From the foregoing it is thought that the construction of our invention will be clearly understood, and, therefore, a more extended explanation has been omitted.

What we claim as new, is,—

A saw set consisting of a base, an upright portion at one side of said base, a slot in said upright portion, an operative head hingedly connected in said slot, said head having a handle attached thereto, said head having a rounded eccentric inner face, a slot cut in said base, an adjustable member carried in last said slot and adapted to hold a saw against said upright portion, a setting block carried on a suitable base, a suitable opening under said head in said base for the reception of said setting block, a means for attaching said setting base to said first base, a means for changing the relative position between said setting block and said head when in closed position so that various settings of saws may be accomplished.

In testimony whereof we affix our signatures in the presence of two witnesses.

GARRETT BYRNS.
HENRI SANCHE.

Witnesses:
R. M. JOVLIC,
JOHN DENT.